(12) United States Patent
Isono et al.

(10) Patent No.: US 10,144,430 B2
(45) Date of Patent: Dec. 4, 2018

(54) CONTROL SYSTEM FOR DRIVE UNIT

(71) Applicants: TOYOTA JIDOSHA KABUSHIKI KAISHA, Toyota-shi, Aichi-ken (JP); ALCHEMICA CORPORATION, Susono-shi, Shizuoka-ken (JP)

(72) Inventors: Hiroshi Isono, Susono (JP); Nobuyoshi Sugitani, Susono (JP); Aizoh Kubo, Kyoto (JP)

(73) Assignees: TOYOTA JIDOSHA KABUSHIKI KAISHA, Toyota-shi (JP); ALCHEMICA CORPORATION, Susono-shi (JP)

(*) Notice: Subject to any disclaimer, the term of this patent is extended or adjusted under 35 U.S.C. 154(b) by 159 days.

(21) Appl. No.: 15/389,881

(22) Filed: Dec. 23, 2016

(65) Prior Publication Data

US 2017/0183009 A1 Jun. 29, 2017

(30) Foreign Application Priority Data

Dec. 24, 2015 (JP) ................. 2015-251009

(51) Int. Cl.
*B60W 30/188* (2012.01)
*B60L 11/14* (2006.01)
(Continued)

(52) U.S. Cl.
CPC ............. *B60W 30/188* (2013.01); *B60L 7/18* (2013.01); *B60L 7/26* (2013.01); *B60L 11/14* (2013.01);
(Continued)

(58) Field of Classification Search
CPC ....... B60K 17/35; B60W 10/12; B60W 10/00; B60W 30/188; B60W 10/08; B60W 10/16;
(Continued)

(56) References Cited

U.S. PATENT DOCUMENTS

2011/0246031 A1* 10/2011 Uematsu ................ B60K 17/35
701/50
2013/0060440 A1* 3/2013 Fukushiro ................. B60L 7/14
701/70
(Continued)

FOREIGN PATENT DOCUMENTS

JP 2012-519812 A 8/2012
WO 2015/008661 A1 1/2015

*Primary Examiner* — Behrang Badii
(74) *Attorney, Agent, or Firm* — Hunton Andrews Kurth LLP

(57) ABSTRACT

A control system for a drive unit configured to control driving force and braking force integrally is provided. The control system comprises: a sensor that detects vehicle conditions and an operation amount of an accelerator pedal etc.; a brake device that is contacted to an input element of a differential unit or a rotary member attached to the drive motor connected to the differential unit; and a controller. The controller is configured to calculate: a target travelling condition based on the vehicle condition and the operation amount detected by the sensor; target drive torques or target braking torques to be applied to the right wheel and left wheel based on the target travelling condition; output torques of a drive motor and a differential motor based on the target driving torques; and a braking force to be established by the brake device and an output torque of the differential motor based on the target braking torques.

2 Claims, 5 Drawing Sheets

(51) Int. Cl.
*B60L 15/20* (2006.01)
*B60W 10/08* (2006.01)
*B60W 10/16* (2012.01)
*B60W 10/18* (2012.01)
*B60W 10/184* (2012.01)
*B60W 30/02* (2012.01)
*B60L 7/18* (2006.01)
*B60L 7/26* (2006.01)
B60T 8/175 (2006.01)
B60K 17/35 (2006.01)
B60W 10/12 (2012.01)
B60W 10/00 (2006.01)

(52) U.S. Cl.
CPC ........... *B60L 15/20* (2013.01); *B60L 15/2009* (2013.01); *B60L 15/2036* (2013.01); *B60W 10/08* (2013.01); *B60W 10/16* (2013.01); *B60W 10/182* (2013.01); *B60W 10/184* (2013.01); *B60W 30/02* (2013.01); B60K 17/35 (2013.01); B60L 2220/42 (2013.01); B60L 2240/12 (2013.01); B60L 2240/16 (2013.01); B60L 2240/18 (2013.01); B60L 2240/22 (2013.01); B60L 2240/423 (2013.01); B60L 2240/461 (2013.01); B60L 2240/463 (2013.01); B60L 2250/26 (2013.01); B60T 8/175 (2013.01); B60W 10/00 (2013.01); B60W 10/12 (2013.01); *B60W 10/18* (2013.01); B60W 2510/083 (2013.01); B60W 2520/105 (2013.01); B60W 2520/125 (2013.01); B60W 2520/14 (2013.01); B60W 2520/28 (2013.01); B60W 2520/30 (2013.01); B60W 2520/406 (2013.01); B60W 2540/10 (2013.01); B60W 2540/12 (2013.01); *B60W 2540/18* (2013.01); *B60W 2710/083* (2013.01); *B60W 2710/125* (2013.01); *Y02T 10/7258* (2013.01)

(58) Field of Classification Search
CPC .. B60W 10/182; B60W 10/184; B60W 30/02; B60W 10/18; B60W 2510/083; B60W 2520/105; B60W 2520/125; B60W 2520/14; B60W 2520/28; B60W 2520/30; B60W 2520/406; B60W 2540/10; B60W 2540/12; B60W 2540/18; B60W 2710/083; B60W 2710/125; B60W 10/14; B60W 30/18172; B60L 7/18; B60L 7/26; B60L 11/14; B60L 15/20; B60L 15/2009; B60L 15/2036; B60L 2220/42; B60L 2240/12; B60L 2240/16; B60L 2240/18; B60L 2240/22; B60L 2240/423; B60L 2240/461; B60L 2240/463; B60L 2250/26; B60T 8/175; B60T 8/4809; B60T 10/00; Y02T 10/7258
See application file for complete search history.

(56) References Cited

U.S. PATENT DOCUMENTS

| | | | |
|---|---|---|---|
| 2013/0080013 A1* | 3/2013 | Kobayashi | B60G 17/08 701/70 |
| 2013/0103264 A1* | 4/2013 | Takashima | B60W 10/184 701/42 |
| 2013/0144476 A1* | 6/2013 | Pinto | B60T 8/17555 701/22 |
| 2013/0210575 A1* | 8/2013 | Kumazaki | B60K 6/48 477/20 |
| 2014/0162842 A1 | 6/2014 | Severinsson et al. | |
| 2016/0153537 A1 | 6/2016 | Kubo et al. | |
| 2016/0214486 A1* | 7/2016 | Suzuki | B60T 8/175 |

* cited by examiner

CONTROL SYSTEM FOR DRIVE UNIT

CROSS REFERENCE TO RELATED APPLICATION

The present invention claims the benefit of Japanese Patent Application No. 2015-251009 filed on Dec. 24, 2015 with the Japanese Patent Office, the disclosures of which are incorporated herein by reference in its entirety.

BACKGROUND

Field of the Invention

Embodiments of the present application relates to the art of a control system for a drive unit that distributes output torque of a prime mover to a right and left wheels having a torque vectoring device for controlling a torque distribution ratio.

Discussion of the Related Art

U.S. Patent Publication No. 2014/162842 describes a torque vectoring device including a differential mechanism for distributing torque of a prime mover to right and left wheels, and a differential motor for applying torque to one of rotary elements of the differential mechanism to control distribution of the torque to the right and left wheels. PCT international publication WO 2015/008661 also describes a drive gear unit of this kind.

U.S. Patent Publication No. 2014/162842 further describes a control system configured to compute a required torque for the differential motor. According to the teachings of U.S. Patent Publication No. 2014/162842, the required torque for the differential motor is calculated based on programs of vehicle stability, traction performance, regeneration control, hybrid control, yaw damping etc., and variables representing the current vehicle state calculated based on detection signals from sensors. In the control system taught by U.S. Patent Publication No. 2014/162842, different programs are executed simultaneously and hence different required torques for the differential motor may be calculated by those programs. In this case, the arbitration functionality selects one of the required torques calculated by the different programs.

According to the teachings of U.S. Patent Publication No. 2014/162842, a motor having a generating function is used as the prime mover, and hence a braking force may be established by regenerating energy by the motor. In a vehicle using the torque vectoring device taught by U.S. Patent Publication No. 2014/162842, a distribution ratio of the braking force to the right and left wheels may be controlled by controlling the differential motor during regeneration of the motor.

In the conventional vehicles, a mechanical brake such as a friction brake is used to apply braking force to the wheels when stopping the vehicle. However, if such mechanical brake is arranged individually for each of the wheel, those brakes have to be controlled by a specific program. Especially, in a case of establishing a braking force by regenerating energy by the motor while establishing a braking force by the mechanical brakes in the vehicle having the torque vectoring device taught by the above-mentioned prior art documents, a complex control is required to control the torque vectoring device and the mechanical brakes cooperatively.

SUMMARY

Aspects of embodiments of the present application have been conceived noting the foregoing technical problems, and it is therefore an object of embodiments of the present invention is to provide a control system for a drive unit configured to control driving force and braking force integrally.

The control system according to the preferred embodiment of the present application is applied to a drive unit comprising: a drive motor; a differential unit that distributes torque delivered from the drive motor to a right wheel and a left wheel; and a differential motor that is connected to any one of rotary elements of the differential unit, and that controls a distribution ratio of the torque distributed to the right wheel and the left wheel through the differential unit by generating torque. In order to achieve the above-explained objective, according to the preferred embodiment of the present application, the control system is provided with: a sensor that detects at least one of vehicle conditions such as longitudinal acceleration, lateral acceleration, yaw rate, speeds of the right wheel and the left wheel, and torques of the right wheel and the left wheel, and at least one of operation amounts of an accelerator pedal, a brake pedal and a steering wheel; a brake device that is frictionally contacted to an input element of the differential unit or a rotary member attached to the drive motor connected to the differential unit to establish a braking force, and in that the braking force is controlled electrically in accordance with an electric power applied thereto; and a first controller. Specifically, the first controller that is configured to calculate: a target travelling condition based on the vehicle condition and the operation amount detected by the sensor; at least any of target drive torques and target braking torques to be applied to the right wheel and left wheel based on the target travelling condition; output torques of the drive motor and the differential motor based on the target driving torques; and a braking force to be established by the brake device and an output torque of the differential motor based on the target braking torques.

In a non-limiting embodiment, the control system may further comprise: a first power source that supplies an electric power to the first controller; a second power source that is independent from the first power source; a parking lock device that stops rotation of any of rotary elements arranged in a torque transmitting route between the drive motor and the wheels; and a second controller that is electrically connected to the second power source to control the parking lock device.

Thus, according to the embodiment of the present application, the first controller calculates torques of the drive motor and the differential motor, and braking torque of the brake device to integrally control the motors and the brake device. According to the embodiment, therefore, it is possible to reduce complexity to carry out different kinds of controls cooperatively. In other words, the control system may be simplified.

In addition, according to the embodiment of the present application, the control system comprises the parking lock device in addition to the brake device, and electric powers are supplied to the first controller controlling the brake device and the second controller controlling the parking lock device from different power sources. According to the embodiment, therefore, the vehicle may be stopped by the parking lock device instead of the brake device even if a failure occurs on the brake device.

BRIEF DESCRIPTION OF THE DRAWINGS

Features, aspects, and advantages of exemplary embodiments of the present invention will become better under

DETAILED DESCRIPTION OF THE PREFERRED EMBODIMENT(S)

Figure 1:
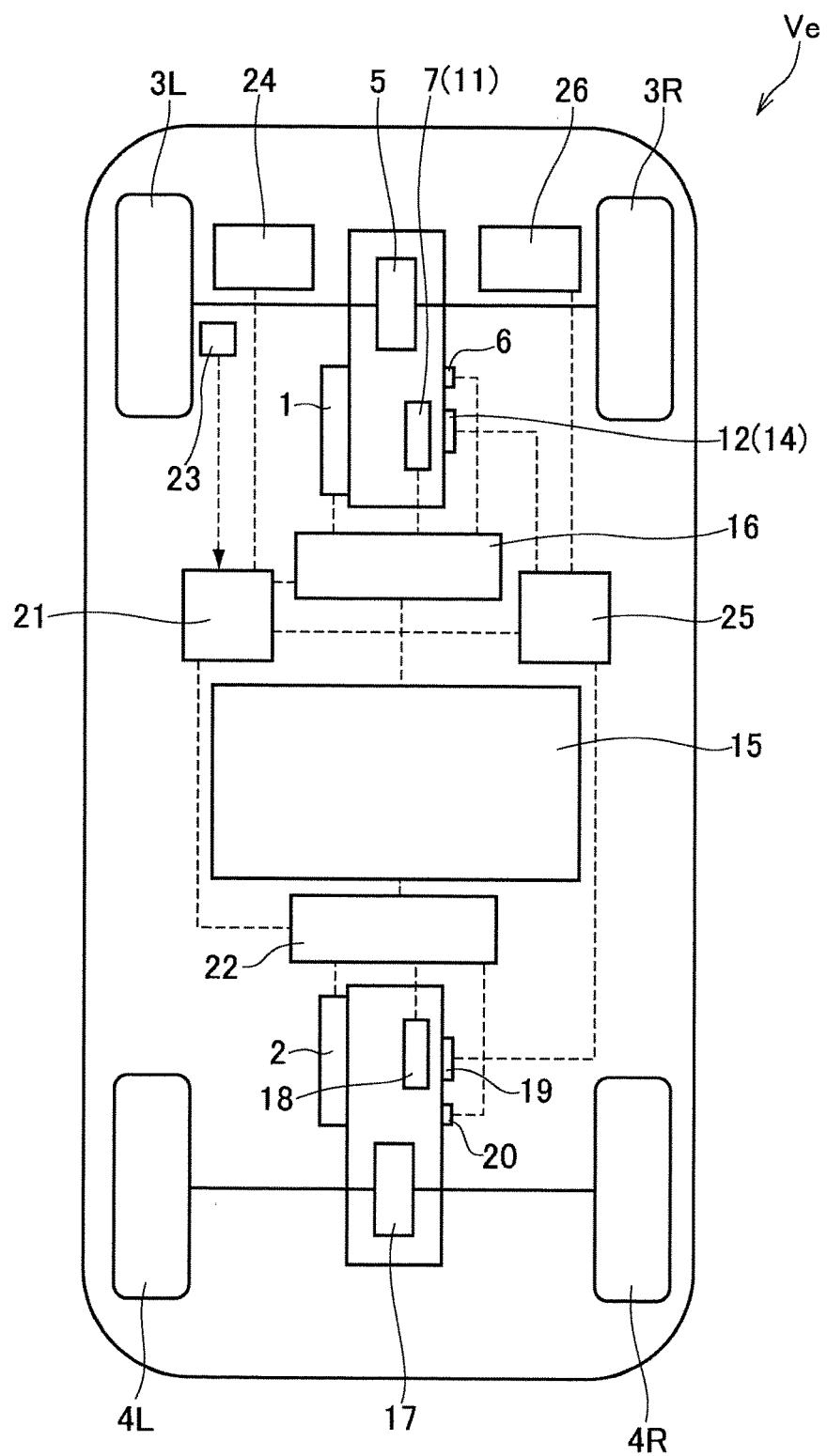
- FIG. 1 is a schematic illustration showing a preferred embodiment of the control system according to the present application.

Preferred embodiments of the present application will now be explained with reference to the accompanying drawings. Referring now to FIG. 1, there is schematically shown a structure of the control system according to the preferred embodiment of the present application. Here, in FIG. 1, dashed-lines indicate electrical connections. As illustrated in FIG. 1, a vehicle Ve is provided with a first drive motor 1 and a second drive motor 2. For example, a permanent magnet synchronous motor used in the conventional hybrid vehicles and electric vehicles may be used individually as the first drive motor 1 and the second drive motor 2. Specifically, the first motor 1 is disposed on a center of width in a front part of the vehicle Ve to deliver torque to a right front wheel 3R and a left front wheel 3L, and the second motor 2 is disposed on a center of width in a rear part of the vehicle Ve to deliver torque to a right rear wheel 4R and a left rear wheel 4L.

A first differential unit 5 as a planetary gear unit is connected to the first motor 1 to distribute output torque of the first motor 1 to the right front wheel 3R and to the left front wheel 3L. In order to control a torque distribution ratio to the right front wheel 3R and the left front wheel 3L, a first differential motor 6 is connected to the first differential unit 5 in such a manner as to apply output torque of the first differential motor 6 to any one of rotary elements of the first differential unit 5. Specifically, torque distributed to any one of the right front wheel 3R and the left front wheel 3L is increased and torque distributed to the other front wheel 3R or 3L is decreased by applying the torque of the first differential motor 6 to the first differential unit 5. Thus, the first differential unit 5 and the first differential motor 6 serve as a torque vectoring device. For example, the torque vectoring device of this kind is described in PCT international publication WO 2015/008661.

Figure 2:
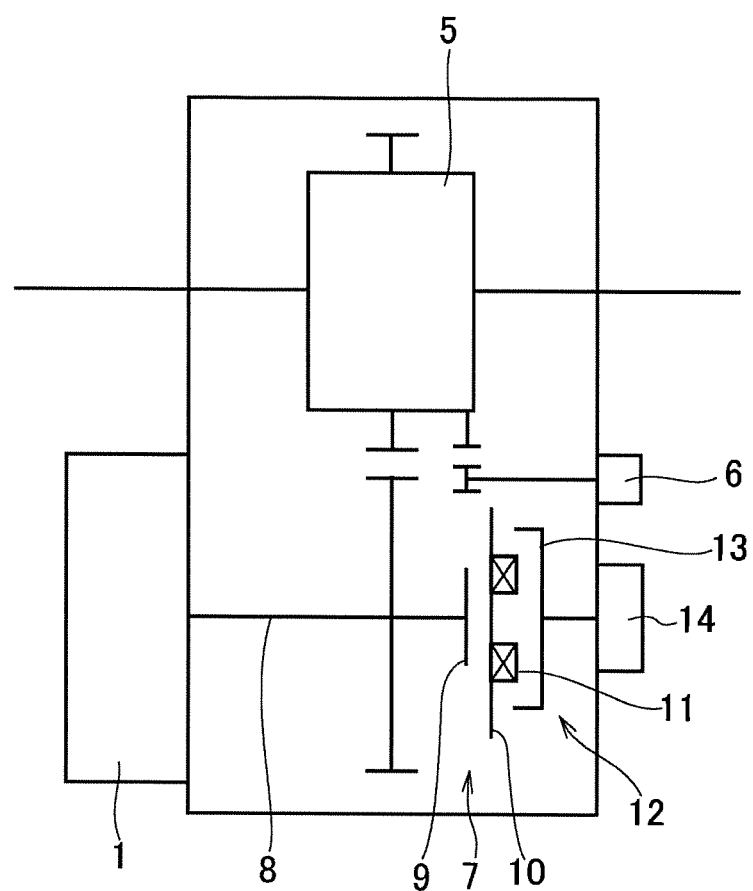
FIG. 2 is a schematic illustration showing a structure for applying torque and braking force from the first motor to the front wheels.

A first brake device 7 is arranged at a position to be contacted to an input element of the first differential unit 5 or a rotary member attached to the first motor 1 connected to the first differential unit 5 to establish a frictional braking force. Turning to FIG. 2, there is shown a structurer of the first brake device 7 used in the control system shown in FIG. 1. As illustrated in FIG. 2, a plate member 9 as a brake rotor is attached to a leading end of the output shaft 8 of the first motor 1, and the first brake device 7 is disposed at a position to apply braking force to the plate member 9. The first brake device 7 comprises a brake disc 10 and a coil 11 as an electromagnetic actuator that is attached to the brake disc 10. When the coil 11 is energized, the brake disc 10 is brought into contact to the plate member 9 by an electromagnetic force established by the coil 11.

The braking force thus established by the first brake device 7 is applied to the right front wheel 3R and the left front wheel 3L through the first differential unit 5. In this situation, a distribution ratio of braking torque to the right front wheel 3R and the left front wheel 3L may be altered by controlling the first differential motor 6.

When the vehicle Ve is parked, the vehicle Ve is powered off and hence the first brake device 7 cannot maintain the braking force during parking. In order to maintain the braking force when the vehicle Ve is powered off, the vehicle Ve is provided with a first parking lock device 12. As illustrated in FIG. 2, the first parking lock device 12 comprises a pushing member 13 that pushes the brake disc 10 toward the plate member 9, and an electromagnetic actuator 14 that moves forward the pushing member 13 to bring the brake disc 10 into contact to the plate member 9 when energized and that fixes a position of the pushing member 13 when unenergized.

That is, a contact pressure between the brake disc 10 and the plate member 9 as the braking force may be controlled in accordance with a travel amount of the pushing member 13 while energizing the electromagnetic actuator 14, and the braking force thus established may be maintained by stopping current supply to the electromagnetic actuator 14. Thus, in the vehicle Ve, the braking force may also be ensured by first parking lock device 12 instead of the first brake device 7.

Turning back to FIG. 1, the first motor 1, the first differential motor 6 and the first brake device 7 are connected to a high-voltage storage device 15 such as a battery and a capacitor. In the vehicle Ve, therefore, an electric power is supplied to the first motor 1, the first differential motor 6 and the first brake device 7 from the storage device 15, and an electric power generated by the first motor 1 is delivered to the storage device 15. In order to convert between direct current and alternate current, and to control a value and a frequency of the current supplied to the first motor 1, the first differential motor 6 and the coil 11, a first inverter 16 is interposed between the storage device 15 and the first motor 1 and the first differential motor 6.

A second differential unit 17 also as a planetary gear unit is connected to the second motor 2 to distribute output torque of the second motor 2 to the right rear wheel 4R and the left rear wheel 4L. A second brake device 18 is also arranged at a position to be contacted to an input element of the second differential unit 17 or a rotary member attached to the second motor 2 connected to the second differential unit 17 to establish a frictional braking force. Braking force established by the second brake device 18 is applied to the right rear wheel 4R and the left rear wheel 4L through the second differential unit 17. A distribution ratio of braking torque to the right rear wheel 4R and the left rear wheel 4L may also be altered by controlling a second differential motor 20 connected to the second differential unit 17. A second parking lock device 19 having a same structure as the first parking lock device 12 is also arranged to ensure braking force even when a failure occurs on an electrical system for supplying electric power to the second brake device 18. Thus, the right rear wheel 4R and the left rear wheel 4L are driven and stopped by same principles as the right front wheel 3R and the left front wheel 3L. A second inverter 22 is also interposed between the storage device 15 and the second motor 2 and the second differential motor 20, so as to convert between direct current and alternate current, and to control a value and a frequency of the current supplied to the second motor 2, the second differential motor 20 and etc.

Figure 3:
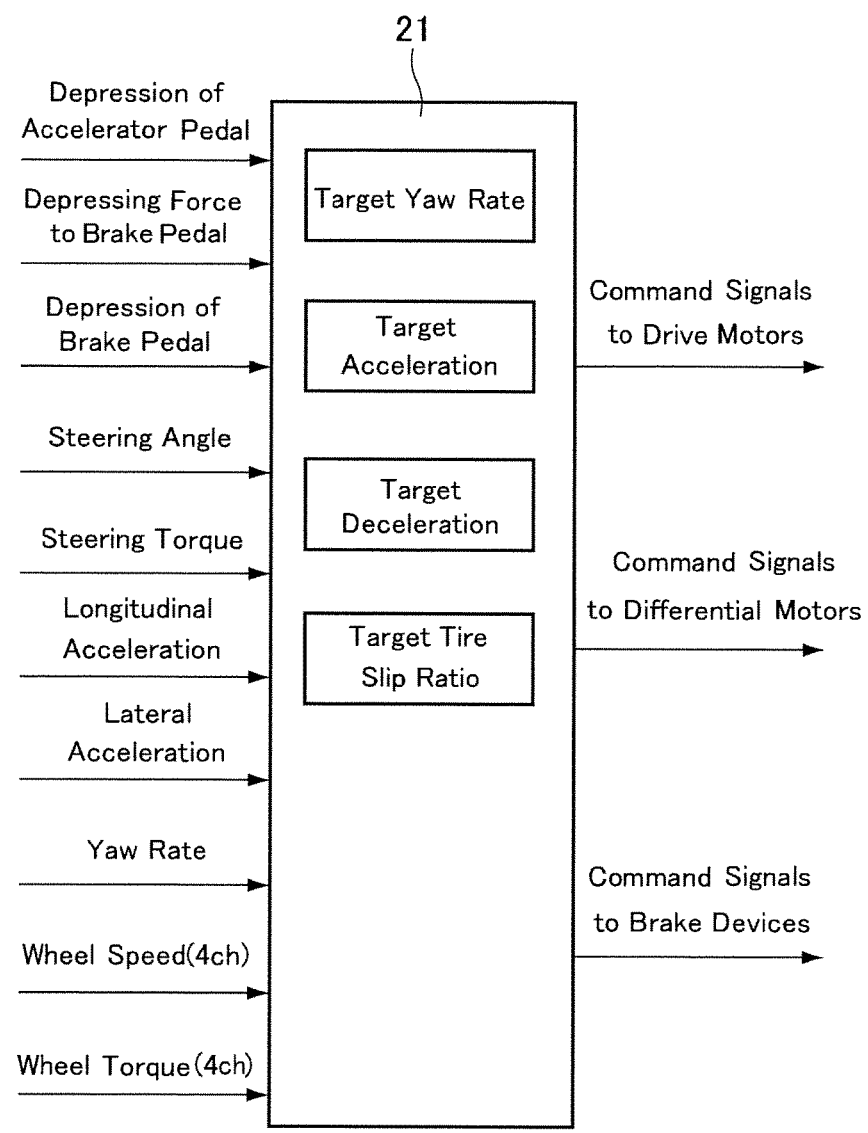
FIG. 3 is a block diagram showing functions of the first ECU.

In order to control the first motor 1, the second motor 2, the first differential motor 6, the second differential motor 20, the first brake device 7 and the second brake device 18, a first electronic control unit (to be abbreviated as the "first ECU" hereinafter) 21 as a first controller is electrically connected to those members. The first ECU 21 is composed mainly of a microcomputer, and functions of the first ECU 21 are shown in FIG. 3. As shown in FIG. 3, signals representing conditions of the vehicle Ve and details of driver's operations are sent to the first ECU 21. The first ECU 21 is configured to compute target values of vehicle behaviors based on the incident signals using formulas and maps installed therein, and to transmit command signals to the motors and brake devices through the first inverter 16 and the second inverter 22.

For example, the signals representing details of driver's operations such as a depression of an accelerator pedal, a depressing force or a depression of a brake pedal, a steering angle and a steering torque of a steering wheel are sent to the first ECU 21. Also, the signals representing vehicle behaviors such as a longitudinal acceleration, a lateral acceleration, a yaw rate of the vehicle Ve, and speeds and torques of the wheels 3R, 3L, 4R and 4L are sent to the first ECU 21. In FIG. 1, a sensor 23 for detecting a speed of the left front wheel 3L is illustrated, and a detection signal of the sensor 23 is sent to the first ECU 21.

In order to execute an anti-lock brake control, a traction control, an electronic stability control, a dynamic yaw rate control and so on, the first ECU 21 calculates a target yaw rate, a target acceleration, a target deceleration and a target tire slip ratio.

The first ECU 21 is further configured to calculate values and frequencies of the currents supplied to the first motor 1 and the second motor 2, values and frequencies of the currents supplied to the first differential motor 6 and the second differential motor 20, and frequencies of the currents supplied to the first brake device 7 and the second brake device 20. Calculation results are transmitted in the form of command signals from the first ECU 21 to the first motor 1, the second motor 2, the first differential motor 6, the second differential motor 20 the first brake device 7 and the second brake device 18. In order to operate the first ECU 21 and to supply an electric power to transistors of the first inverter 16 and the second inverter 22, the vehicle Ve is further provided with a first auxiliary battery 24 as a first power source whose voltage is lower than that of the storage device 15.

Figure 4:
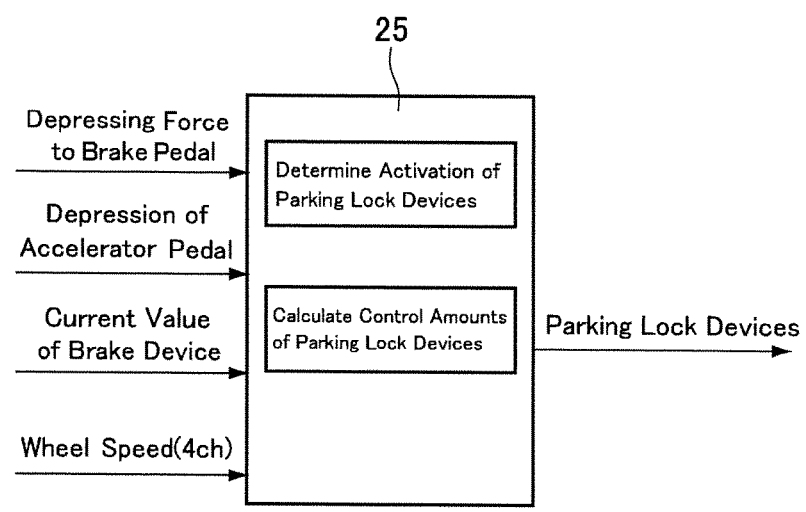
FIG. 4 is a block diagram showing functions of the second ECU.

When a failure occurs on the electrical system between the first ECU 21 and the first auxiliary battery 24 or the first inverter 16, the first parking lock device 12 and the second parking lock device 19 are controlled by a second electronic control unit (to be abbreviated as the "second ECU" hereinafter) 25 as a second controller to ensure breaking force. The second ECU 25 is also composed mainly of a microcomputer, and functions of the second ECU 25 are shown in FIG. 4. As shown in FIG. 4, signals representing conditions of the vehicle Ve and details of driver's operations are also sent to the second ECU 25. The second ECU 25 is configured to determine actuation of the first parking lock device 12 and the second parking lock device 19, and to calculate control amounts of the first parking lock device 12 and the second parking lock device 19 based on the incident signals using formulas and maps installed therein. The calculated control amounts are transmitted to the first parking lock device 12 and the second parking lock device 19 in the form of command signals.

To this end, the signals representing details of driver's operations such as a depressing force applied to the brake pedal, a depression of the brake pedal, and current values of the first brake device 7 and the second brake device 18 are sent to the second ECU 25. Also, the signals representing vehicle behaviors such as speeds of the wheels 3R, 3L, 4R and 4L are sent to the second ECU 25. Specifically, the second ECU 25 is configured to actuate the first parking lock device 12 and the second parking lock device 19 based on at least one of the following facts that: (i) the vehicle Ve has been parked longer than a predetermined period of time; (ii) a switch to actuate the electromagnetic actuator 14 is turned on by a driver or passenger; (iii) an ignition is turned off during parking; and (iv) at least any one of the first brake device 7 and the second brake device 18 cannot be activated. The second ECU 25 is further configured to calculate target braking forces to be achieved by the first parking lock device 12 and the second parking lock device 19 based on a depressing force and a depression of the brake pedal and speeds of the wheels 3R, 3L, 4R and 4L, and to supply current to electromagnetic actuators (not shown) of the first parking lock device 12 and the second parking lock device 19 to achieve the calculated braking forces. In order to operate the second ECU 25, and to supply an electric power to the first parking lock device 12 and the second parking lock device 19, the vehicle Ve is further provided with a second auxiliary battery 26 as a second power source. The command signal may be transmitted between the first ECU 21 and the second ECU 25. For example, the second ECU 25 is allowed to be operated when a failure occurs on the first ECU 21.

Thus, the first ECU 21 integrally controls torques of the first motor 1, the second motor 2, the first differential motor 6 and the second differential motor 20, and braking torques of the first brake device 7 and the second brake device 18. According to the preferred embodiment, therefore, it is possible to reduce complexity to carry out different kinds of controls cooperatively. In other words, the control system may be simplified. In addition, even if a failure occurs on the first ECU 21, the first brake device 7 or the second brake device 18, the vehicle Ve may be stopped by the second ECU 25, the first parking lock device 12 or the second parking lock device 19.

Figure 5:
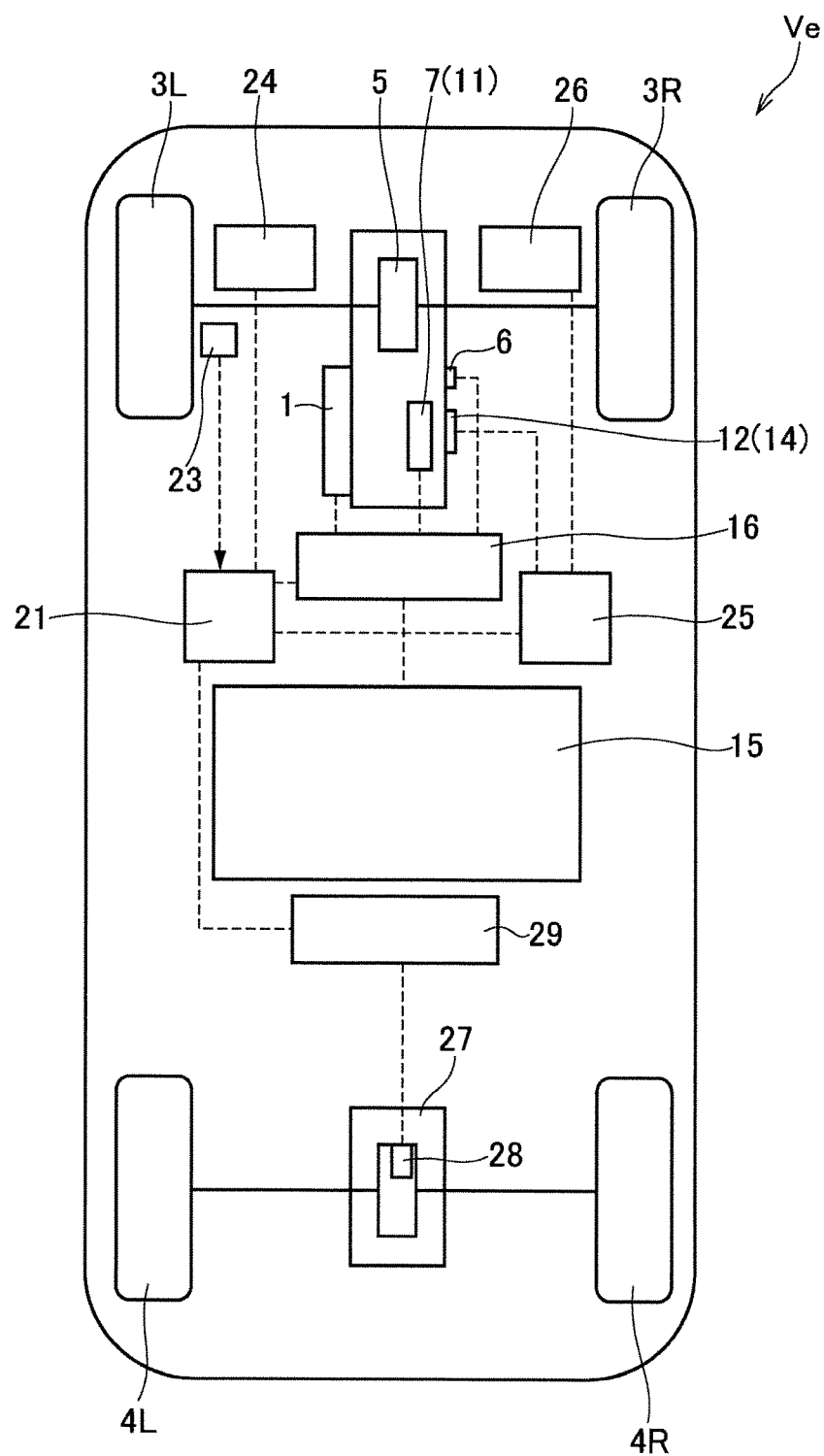
FIG. 5 is a schematic illustration showing another embodiment of the control system according to the present application.

The control system according to the present application may be applied not only to the four-wheel drive vehicle as shown in FIG. 1 but also to a front drive vehicle and a rear drive vehicle. Turning to FIG. 5, there is shown another embodiment in which the control system according to the present application is applied to a front drive vehicle in which the right front wheel 3R and the left front wheel 3L serve as drive wheels. In the following description, detailed explanations for the elements in common with those in the embodiment shown in FIG. 1 will be omitted. In the vehicle Ve shown in FIG. 5, a third differential unit 27 is disposed on a center of width in a rear part of the vehicle Ve. The third differential unit 27 is adapted to allow a relative rotation between the right rear wheel 4R and the left rear wheel 4L, and a structure thereof should not be limited to that of a specific mechanism. In order to independently control braking forces applied to the right rear wheel 4R and the left rear wheel 4L, the third differential unit 27 is provided with a third brake device 28 that is also controlled electrically. A third inverter 29 is electrically connected to the first ECU 21 so that current is supplied to the third brake device 28 from the third inverter 29 in response to the command signal transmitted from the first ECU 21.

Although the above exemplary embodiment of the present application have been described, it will be understood by those skilled in the art that the present application should not be limited to the described exemplary embodiment, and various changes and modifications can be made within the spirit and scope of the present application.

What is claimed is:

1. A control system for a drive unit, comprising:
   a drive motor;
   a differential unit that distributes torque delivered from the drive motor to a right wheel and a left wheel;
   a differential motor that is connected to any one of rotary elements of the differential unit, and that controls a distribution ratio of the torque distributed to the right wheel and the left wheel through the differential unit by generating torque;
   a sensor that detects at least one of vehicle conditions such as longitudinal acceleration, lateral acceleration, yaw rate, speeds of the right wheel and the left wheel, and torques of the right wheel and the left wheel, and at least one of operation amounts of an accelerator pedal, a brake pedal and a steering wheel;
   a brake device that is frictionally contacted to an input element of the differential unit or a rotary member attached to the drive motor connected to the differential unit to establish a braking force, and in that the braking force is controlled electrically in accordance with an electric power applied thereto; and
   a first controller that is configured to calculate
   a target travelling condition based on the vehicle condition and the operation amount detected by the sensor,
   at least any of target drive torques and target braking torques to be applied to the right wheel and left wheel based on the target travelling condition,
   output torques of the drive motor and the differential motor based on the target driving torques, and
   a braking force to be established by the brake device and an output torque of the differential motor based on the target braking torques.

2. The control system for a drive unit as claimed in claim 1, further comprising:
   a first power source that supplies an electric power to the first controller;
   a second power source that is independent from the first power source;
   a parking lock device that stops rotation of any of rotary elements arranged in a torque transmitting route between the drive motor and the wheels; and
   a second controller that is electrically connected to the second power source to control the parking lock device.

* * * * *